Aug. 13, 1968  E. P. JASTRAM ET AL  3,397,333
ELECTRICAL TEMPERATURE SENSORS WITH CONNECTED
HEAT CONDUCTIVE MEANS
Filed Nov. 10, 1965  2 Sheets—Sheet 1

Edward P. Jastram,
Harry M. Landis,
Inventors,
Koenig, Senniger, Powers and Leavitt,
Attorneys.

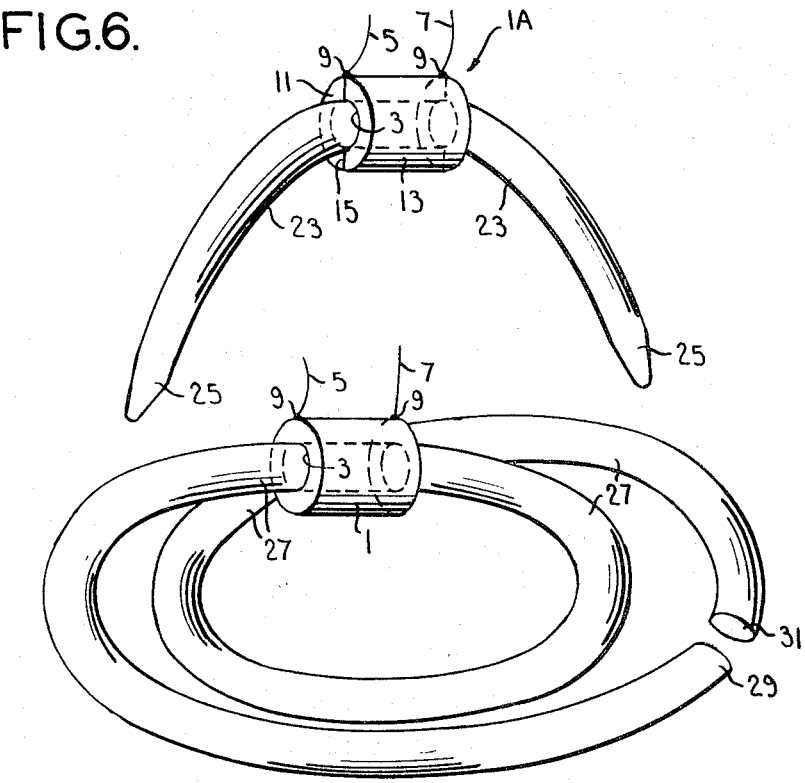
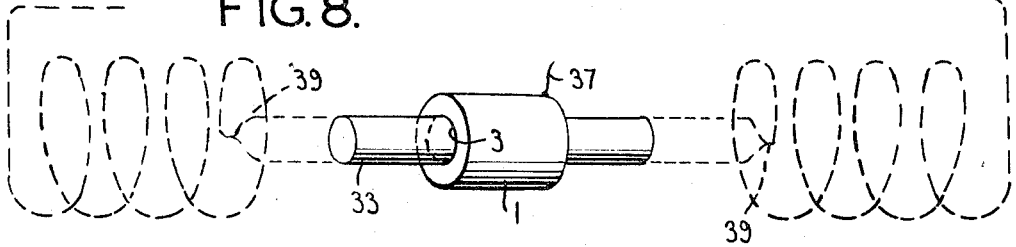
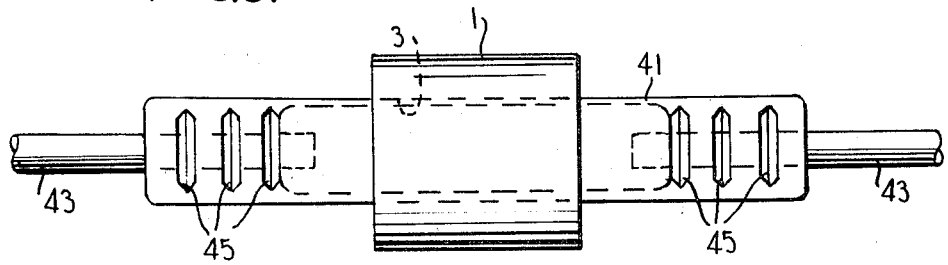

3,397,333
ELECTRICAL TEMPERATURE SENSORS WITH CONNECTED HEAT CONDUCTIVE MEANS
Edward P. Jastram, Rehoboth, and Harry M. Landis, Norton, Mass., assignors to Texas Instruments Incorporated, Dallas, Tex., a corporation of Delaware
Filed Nov. 10, 1965, Ser. No. 507,102
15 Claims. (Cl. 310—68)

ABSTRACT OF THE DISCLOSURE

A small sleeve of solid electrically conductive material which has a substantial temperature coefficient of resistance. The preferred material is one selected from the group consisting of ceramic semiconductors, plastic semiconductors and ionic conductors. The sleeve has one or more signal leads electrically connected with it. Extending through the sleeve in heat conductive interior contact therewith is a heat conductive wire, rod, tube or the like for conducting heat from a distance to the sensor element. In one form of the invention the sleeve is an integral solid cylinder and in another it is composed of two semicylindrical parts which are metallurgically bonded to one another to form a complete cylinder.

---

In the accompanying drawings, in which several of various possible embodiments of the invention are illustrated, FIG. 1 is an isometric view of an integral form of a sensor element made according to the invention;

FIG. 6 is an isometric view illustrating another probe form of the invention; and FIGS. 7, 8 and 9 are views showing other applications of the invention, FIG. 9 being in elevation.

Corresponding reference characters indicate corresponding parts throughout the several views of the drawings. The drawings are not to exact scale and are considerably enlarged.

Figure 1:
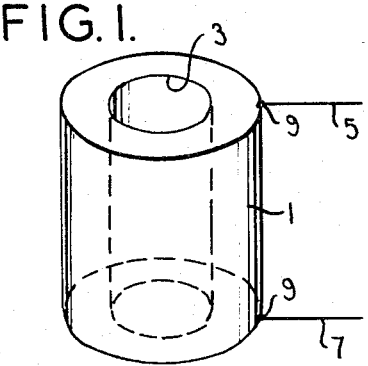

Referring now more particularly to FIG. 1, there is shown at numeral 1 a solid temperature-detecting sleeve, preferably in the form of a circular cylinder, a material having a substantial temperature coefficient of resistance. The cylindrical form 1 provides a cylindrical hole 3 which is of a diameter to accept with a contacting slip or press fit a wire, rod, tube or the like. The hole 3 will have a diameter which accords substantially to the diameter of the wire, rod or tube to be inserted therein, with a fit to provide good heat-conductive contact. In miniature form, the sleeve 1 may be quite small, as for example, approximately ⅛ inch outside diameter and a length of approximately ⅛ inch, with a ³⁄₆₄ inch inside diameter. Other sizes are not precluded, however. For certain applications to be described, two signal wires such as 5 and 7 are bonded to the cylinder 1 at suitably spaced points 9. The bonds are electrically conductive and may be accomplished by means of metallizing, soldering, electroless-nickel plating or in some cases spring-pressure contacts or combinations thereof.

Figure 2:
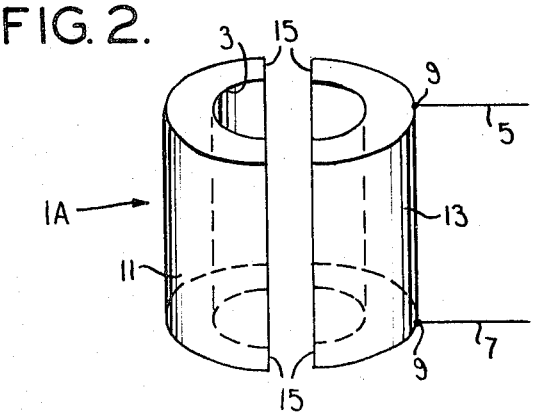
FIG. 2 is a view similar to FIG. 1, showing a split form of said element.

In FIG. 2 is shown a split cylindrical form 1A of the device, the solid split elements being numbered 11 and 13. These elements may be brought together around a wire, rod or tube and bonded along edges 15 to make up the equivalent 1A of the solid cylinder 1 shown in FIG. 1 The material of the semicylinders 11 and 13 is the same as the material of which cylinder 1 is composed. Bonding along the edges 15 may be accomplished, again by metallizing, soldering on electroless plating or the like, so that the finished joints are both heat and electrically conductive.

The material of which the sleeves 1 and 1A are composed should have a substantial temperature coefficient of resistance. This may be of the positive temperature coefficient (PTC) type or it may be of the negative temperature coefficient (NTC) type. There are various classes of materials and systems of materials known in the art which will provide the required coefficient.

One class of the above-required materials for PTC operations is of the so-called semiconductor type. In this class are various ceramic systems. One of these is barium titanate ($BaTiO_3$) which is doped with lanthanum (La) samarium (Sm) or niobium (Nb), etc., to obtain the PTC characteristic. Additives such as strontium (Sr) or lead (Pb) may be added to such a doped $BaTiO_3$ system in order to modify its PTC characteristic. The addition of strontium lowers the temperature at which a comparatively rapid increase in resistance occurs, and lead raises it. Thus it will be seen that various control parameters may be met by a suitable choice of dopants and additives. Other materials in this class are zinc nickel titanate ($ZnNiTiO_3$), and niobium oxide ($Nb_2O_{4.9988}$) which is slightly oxygen deficient. An organic material in this class is the plastic known as carbon-black-filled, cross-linked polyethylene.

A second class of useful semiconductor materials for NTC operation includes mixtures of manganese oxide and nickel oxide (MnO–NiO) with appropriate additions of cobalt oxide (CoO), copper oxide (CuO) or ferrous oxide (FeO). Other useful compounds in this second class are tin oxide ($SnO_2$), copper oxide (CuO), silicon carbide (SiC) and vanadium tetraoxide ($V_2O_4$ appropriately doped with lanthanum (La), lead (Pb) calcium (Ca), strontium (Sr), barium (Ba), et cetera.

A third class of useful materials are of the NTC class and include certain ceramics such as zirconium oxide ($ZrO_2$), magnesium oxide (MgO), aluminum oxide ($Al_2O_3$) and a mixture known as steatite ($SiO_2 \cdot 2MgO$) et cetera.

In this third class are also certain glasses such as Pyrex Vycor and lime glass. The words Pyrex and Vycor are trademark designations of the Corning Glass Works o Corning, N.Y.

Figure 3:
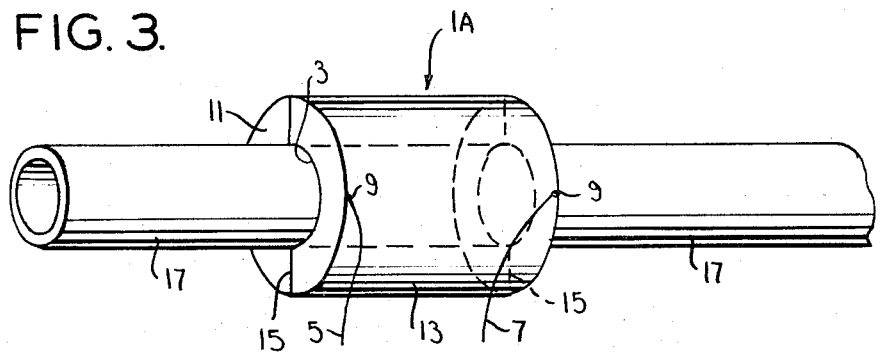
FIG. 3 is an isometric view showing an application of said element for carrying out the invention.

Referring now to FIG. 3, there is shown at numeral 17 a tube which, for example, may carry a liquid, the temperature of which it may be desired to sense and for which an electrical signal is to be provided for indicating and/or control purposes. To this end, semicylinders 1 and 13 of the sensor material such as shown in FIG. 2 may be engaged around the tube 17, the wires 5 and 7 being wired into an appropriate display and/or control circuit. It will be appreciated that in this application of the invention, the split form shown in FIG. 2 is preferable because usually a tube such as 17 has endwise fittings which would preclude telescoping thereon of a form such as shown in FIG. 1. However, in the absence of such fittings, at least on one end of the tube, the form of FIG. 1 may be telescoped into place on the tube.

Figure 4:
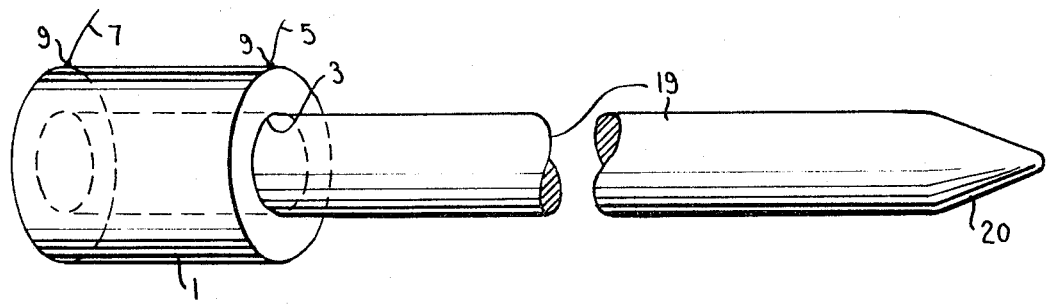
FIG. 4 is an isometric view illustrating a probe form of the invention.
Figure 5:
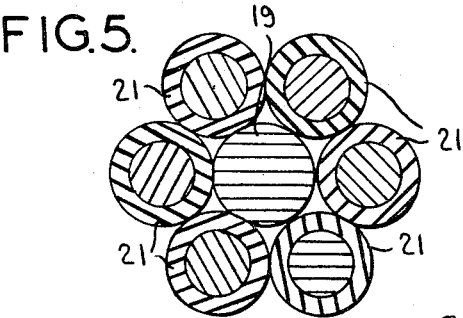
FIG. 5 is a cross section illustrating application to motor windings (for example) of the probe form shown in FIG. 4.

In FIG. 4 is shown a form of the invention employing the detecting sleeve of FIG. 1, which in this case will be assumed to be of diminutive size for acceptance with a press fit in the hole 3 of the end of a heat-conductive probe 19. A suitable stiff small-diameter wire of iron copper or the like may be used to form the probe 19. The sulting integral probe unit (1, 19) may be conveniently applied, for example, to insulated motor windings 21 as illustrated in FIG. 5. The tapered end 20 facilitates probing. This is readily accomplished by needling the small probe wire 19 into available space between windings, as illustrated in FIG. 5. The probe 19, being a good heat conductor, effectively transmits heat from the windings 1 to the cylindrical sensor material 1 to provide the desired signal across the wires 5 and 7.

FIG. 6 illustrates the application of the split form 1A of the invention to a curved probe member 23 having two tapered ends 25 for simultaneous probing application at two points. This is of advantage in that two separated regions may be simultaneously sensed for high-temperature conditions. Moreover, the double-ended probe in some cases lends itself to better procurement of the sensor in a mass of windings or the like. It will be understood that the FIG. 1 integral form 1 of the sensor material may be employed for the FIG. 6 application provided the wire is ductile so that it may be inserted into the opening 3 while in a straight form and then bent to the two-pronged form shown.

In FIG. 7 is shown a form of the invention in which the cylindrical form 1 shown in FIG. 1 has a ductile conductor wire 27 threaded therethrough. In this case wire 7 is of considerable length so that it may, for example, be looped one or more times around a tooth or land of a motor stator to form a shorted secondary turn or turns. In this case the wire 27 should be connected at its ends 9 and 31, which may be joined by twisting together, soldering or the like. In this case the temperature sensed by the sensing element 1 is dependent upon the changing magnetic field, which in turn is dependent upon the current flowing in the windings, as well as upon the temperature of the surroundings. Because of the interrelation of these quantities, this arrangement provides a means for anticipatory control.

Another use of the FIG. 7 form of the invention is to loop the wire 27 which supports sensor 1 around a bundle of A.C. motor field windings, again forming a shorted secondary turn or turns by connecting its ends. This is done in such a way that the resulting loop or loops do not lie in a plane perpendicular to the bundle of field windings. As a result, a current will be induced in the shorted turn or turns. This induced current will be proportioned to the current flowing in the enclosed motor field windings, again forming an anticipatory control.

Another application of the invention is illustrated in FIG. 8, wherein the cylindrical sensor 1 is carried on a length of high-resistance wire 33 (nickel, for example) which may be spliced in as an inserted part of a conventional insulated motor winding shown by the dotted loops. In this case the nickel wire insert 33 may be uninsulated so that the cylindrical sensor is in electrical contact therewith. In this case only a single signal lead such as 37 is required on the sensor (for example), the other lead such as at any point 39, being taken from the bare nickel 33. In the alternative event that the nickel wire 33 is insulated, leads such as 5 and 7 shown in FIGS. 1 and 2 should be employed on the sleeve 1.

As shown in FIG. 9, cylinder 1 may be mounted upon high-resistance (nickel, for example) tube 41 into the opposite ends of which are inserted the cut ends 43 of one turn of a motor winding. After their insertion the tube 1 is crimped on both wire ends 43, as shown at 45. Instead of crimping soldering may be substituted. In either the FIG. 8 or the FIG. 9 case, the insert 33 or 41, as the case may be, has a higher resistance than the motor windings proper, and will rapidly develop heat in close proximity to the sensor 1A or 1. Because of ordinary conduction and radiation this local development of heat under normal operating conditions will have little effect on the temperature at the sensor 1. On the other hand, under conditions of severe overload and resulting fast temperature rise, the temperature will build up more rapidly at the sensor 1 than in the remainder of the windings, thus providing a measure of anticipation of any trouble to be guarded against.

In view of the above, it will be seen that, as circumstances warrant, the forms 1 or 1A of the sensing material shown in FIGS. 1 and 2 may be employed interchangeably.

While substantially circular cylinders and semicylinders are illustrated in FIGS. 1 and 2, and are preferred, other forms may be used which will produce a sleeve member composed of material having a large temperature coefficient of resistance as above described. Substantially circular cylinders, particularly on their insides, are preferred because a maximum heat-conductive contact area with wires and the like is thus obtained.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temperature-sensing element comprising a sleeve of solid electrically conductive material having a substantial temperature coefficient of resistance and at least one signal lead electrically conductively externally attached thereto, the length and outside diameter of said element being on the order of 1/8 inch and its inside diameter on the order of 3/64 inch.

2. An element according to claim 1, wherein the number of leads is greater than one.

3. An element according to claim 1, wherein the sleeve is composed of two metallurgically bonded semicylindrical parts.

4. A temperature-sensing element comprising a sleeve of solid electrically conductive material having a substantial temperature coefficient of resistance and at least one signal lead electrically conductively externally attached thereto, said material being selected from the group consisting of ceramic semiconductors, plastic semiconductors and ionic conductors, the sleeve being of internal circular cylindrical form and also of external circular cylindrical form and wherein the sleeve is composed of two bonded semicylindrical parts.

5. A temperature-sensing unit comprising a sleeve of solid electrically conductive material having a substantial temperature coefficient of resistance, at least one signal lead electrically connected therewith, and a length of wire-like heat-conductive metal extending substantially through at least a portion of the sleeve and in direct internal heat-conductive engagement therewith.

6. A unit made according to claim 5, wherein said length extends substantially from one side of the sleeve to form a probe.

7. A unit made according to claim 5, wherein said length extends substantially from both sides of the sleeve to form two extensions.

8. A unit made according to claim 7, wherein each extension is curved, thereby forming two probes of the extensions.

9. A unit made according to claim 7, wherein said length is composed of a wire extending from each side of the sleeve to an extent sufficient to form a winding part of an electric motor.

10. A unit made according to claim 9, wherein said extension is composed of ductile wire.

11. Electric-motor, temperature-sensing means comprising a motor winding, a sleeve of solid electrically conductive material having a substantial temperature coefficient of resistance and at least one signal lead electrically connected therewith, a length of heat conductive metal extending through said sleeve and in direct heat-conductive engagement therewith, said length being electrically connected into the motor winding, the resistance of said heat-conductive length of metal being comparatively high in relation to the resistance of said winding.

12. Electric-motor, temperature-sensing means according to claim 11, wherein said length of heat-conductive metal is in the form of wire spliced into the motor winding.

13. A temperature sensing unit according to claim 11 wherein said conductive member is composed of nickel.

14. A temperature-sensing unit comprising a sleeve of material having a large temperature coefficient of resistance and a substantial length of ductile conductive wire extending through said sleeve, said length being sufficient to form a secondary shorted winding loop in a motor.

15. A temperature-sensing assembly for sensing liquid temperatures, comprising a length of tubing for carrying liquid, a sleeve around said tubing in heat-conductive contact therewith and composed of a material having a large temperature coefficient of resistance selected from the group consisting of ceramic semiconductors, plastic semiconductors and ionic conductors.

References Cited

UNITED STATES PATENTS 2,421,759  6/1947  Pearson _____ 338—333

LARAMIE E. ASKIN, *Primary Examiner.*

D. A. TONE, *Assistant Examiner.*

UNITED STATES PATENT OFFICE
CERTIFICATE OF CORRECTION

Patent No. 3,397,333 August 13, 1968

Edward P. Jastram et al.

It is certified that error appears in the above identified patent and that said Letters Patent are hereby corrected as shown below:

Column 1, line 13, "which has" should read -- has --; after line 25, insert the following paragraphs:

Among the several objects of the invention may be noted the provision of a solid temperature sensor element having a substantial temperature coefficient of resistance and of form readily applicable in good heat-conductive contact wi heat-conductive wires, rods, tubes and the like to form efficient sensor assemblies having various useful characte istics; the provision of sensor assemblies having probe an like elements adaptable for various applications in a wide field of use; and the provision of such sensor elements an sensor assemblies which may be miniaturized for insertion into small spaces where temperatures are to be sensed, such as within motor windings or the like. Other objects and features will be in part apparent and in part pointed out hereinafter.

The invention accordingly comprises the constructions hereinafter described, the scope of the invention being indicated in the following claims.

Signed and sealed this 3rd day of February 1970.

(SEAL)
Attest:

EDWARD M. FLETCHER, JR.
Attesting Officer

WILLIAM E. SCHUYLER, JR.
Commissioner of Patents